// United States Patent [15] 3,662,289
Dienst [45] May 9, 1972

[54] FREQUENCY MODULATION BY LIGHT IMPINGEMENT ON A SOLID STATE OSCILLATOR

[72] Inventor: Joseph F. Dienst, Princeton, N.J.
[73] Assignee: RCA Corporation

[22] Filed: July 30, 1970
[21] Appl. No.: 64,112

Related U.S. Application Data

[63] Continuation of Ser. No. 733,000, May 29, 1968, abandoned.

[52] U.S. Cl. ..............................332/3, 332/16 T, 332/29 R
[51] Int. Cl. ....................................H03c 3/36, H03c 3/38
[58] Field of Search ..............................332/3, 16, 22, 31 T

[56] References Cited

UNITED STATES PATENTS 2,794,863 6/1957 Van Roosbroeck ......................332/3

*Primary Examiner*—Roy Lake
*Assistant Examiner*—Darwin R. Hostetter
*Attorney*—Edward J. Norton

[57] ABSTRACT

Frequency modulation by varying the intensity of light impinging on a three terminal GaAs microwave oscillator.

7 Claims, 4 Drawing Figures

PATENTED MAY 9 1972 3,662,289

INVENTOR
JOSEPH F. DIENST

BY [signature]
ATTORNEY

FREQUENCY MODULATION BY LIGHT IMPINGEMENT ON A SOLID STATE OSCILLATOR

This is a continuation of my copending application, Ser. No. 733,000, filed May 29, 1968, and now abandoned.

BACKGROUND

Two types of three terminal GaAs microwave oscillators are known each of which comprises a small block of GaAs. In one of these types of oscillators, half of the block of GaAs is negatively doped and the remainder of the block is positively doped, whereby the block of GaAs includes a PN junction. A kerf is provided in the block extending perpendicularly to the junction and penetrating the negatively doped portion of the block to a distance which is short of the junction. An electrode is applied to the uncut face of the block that is parallel to the junction, and an electrode is applied to each portion of the cut face that is parallel to the junction. In the other one of these types of oscillators, the block is all doped negatively and a nickel electrode is deposited on one face of the block, a kerf being provided in the block extending through the opposite face towards the nickel electrode, separate electrodes being applied to each of the two portions of the cut face. In each type of oscillator, energizing voltage is applied between the two electrodes on the cut face of the block. In such microwave oscillators, variation of a biasing voltage which is applied between the electrode applied to the uncut face and one of the other electrodes results in modulation of the frequency of the oscillations provided by the oscillator. A more complete discussion of three-terminal solid state (e.g., GaAs) microwave oscillators is given in the article entitled "CW Three-Terminal GaAs Oscillator," by K. G. Petzinger, A. E. Hahn, Jr. and A. Matzelle, appearing on pages 403 and 404 of the July, 1967 issue of IEEE Transactions on Electron Devices.

SUMMARY

This invention is based on the discovery that the frequency of modulations in such three terminal microwave oscillators is also varied by applying a light beam to the bottom of the kerf in the block of GaAs. The light applied to the bottom of the kerf may be modulated in intensity to change the frequency produced by the three terminal GaAs microwave oscillator, thereby frequency-modulating the oscillator in a substantially linear manner for a range of light intensities.

BRIEF DESCRIPTION OF THE DRAWINGS

The invention will be better understood upon reading the following description in connection with the accompanying drawing in which.

DESCRIPTION

Figures 1, 2, 3, 4:
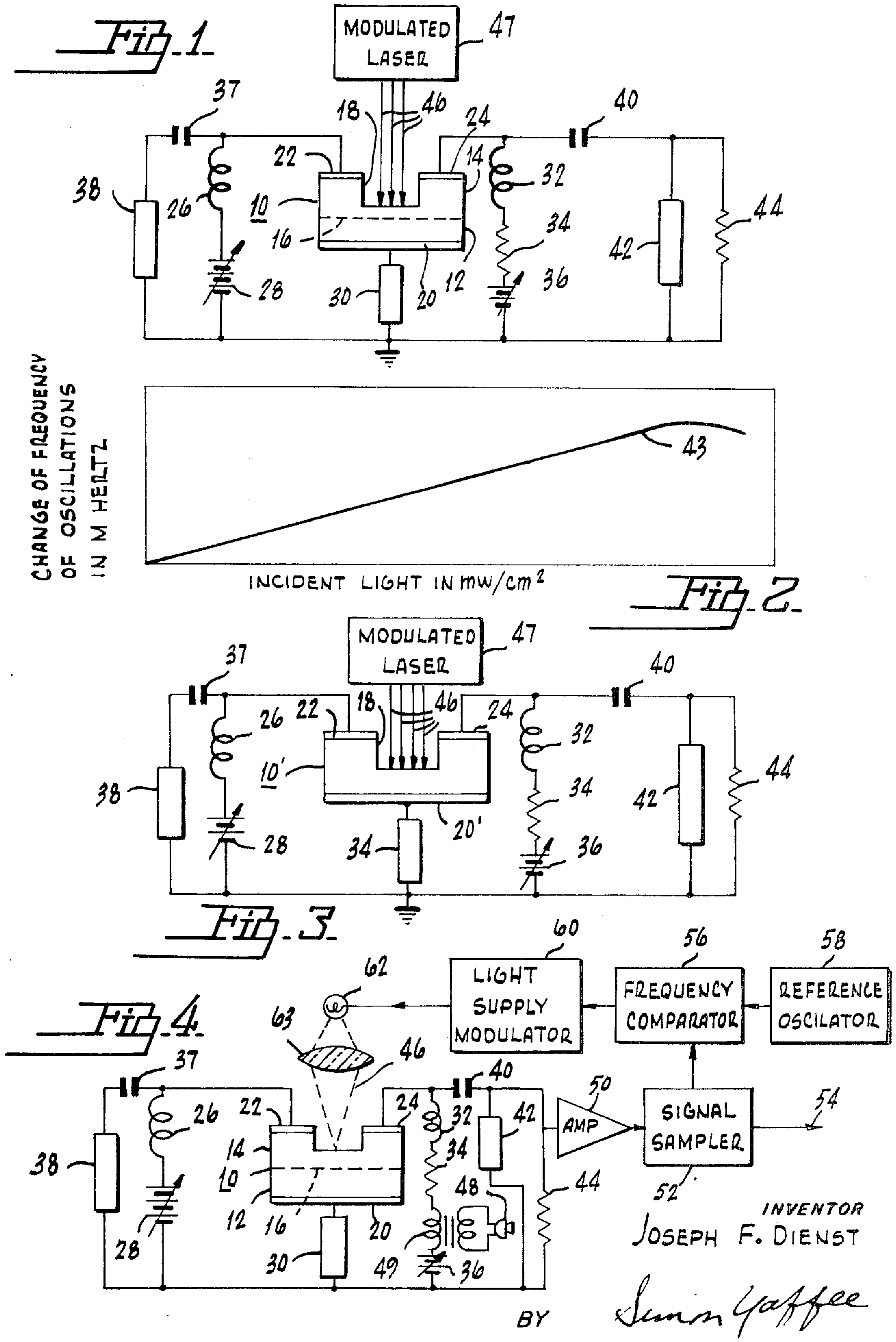
FIG. 1 is a circuit diagram of an oscillator including an embodiment of this invention.
FIG. 2 is a curve relating the change in frequency of the oscillator of FIG. 1 to the intensity of the light applied to the oscillator.
FIG. 3 is a circuit diagram of a modified oscillator also including an embodiment of this invention.
FIG. 4 is a frequency regulator including an oscillator of the type shown in FIG. 1.

As illustrated in FIG. 1, a block 10 of gallium arsenide (GaAs) is provided. The lower portion 12 (as viewed in FIG. 1) of the block 10 is doped with a material such as zinc to provide P material. The remainder 14 of the block 10 is doped with the material such as silicon to provide N material, whereby, a PN junction 16 appears in the block 10. A kerf 18 is formed in the upper or N portion 14 of the block 10, the kerf 18 extending downwardly nearly to the junction 16, that is to within a distance of a few microns from the junction 16. The kerf 18 may be made by a saw or by etching or by any known method. The width of the kerf is not critical. The bottom of the kerf 18 extends parallelly with respect to the junction 16. An electrode 20 is applied to the bottom of the block 10 and an electrode 22 is applied to the top of one of the raised surfaces of the upper portion 14 produced by the kerf 18. A third electrode 24 is applied to the top of the other of the raised surfaces comprising the portion 14. A choke coil 26, a source 28 of variable, frequency modulating bias voltage and a first reactor 30 are connected in the order named between the electrode 22 and the electrode 20. A choke coil 32, a resistor 34 and a source 36 of adjustable supply voltage are connected in series between the electrode 24 and the junction of the reactor 30 and the source 28. A blocking capacitor 37 and a second reactor 38 are connected across the choke coil 26 and the biasing source 28. A blocking capacitor 40 is connected in series with a parallelly connected third reactor 42 and a load impedance 44 between the electrode 24 and the junction of the source 28 and the first reactor 30. The junction of the reactors 30 and 42 are grounded as shown. The voltages 28 and 36 are of opposed polarity in the circuit traced between the electrodes 22 and 24. One of the sources 28 or 36 is greater than the other whereby a supply voltage is provided between the electrodes 22 and 24. The polarity of the supply voltage with respect to the electrodes 22 and 24 is not important. Here, the source 28 is shown to be greater than the source 36.

The circuit so far described will oscillate at a frequency depending on the values of the reactors 30, 38 and 42 and on the capacity of the space charge provided by the PN junction 16. The reactances 30, 38 and 42 may be of the lumped type for low frequencies and of the distributed type for high frequencies. By changing the voltage of either of the sources 28 or 36, the potential across the PN junction 16 will be varied, thus varying the accompanying junction capacitance and therefore varying the frequency of the oscillations provided by the described oscillator.

When a beam of light 46 is applied to the bottom of the kerf 18, the light generates electron-hole pairs in the N-GaAs region. This increases the conductivity of the N-GaAs in the region below the kerf 18 and allows more current to flow through resistor 34. As a result the potential across the junction 16 changes with an accompanying change in junction capacitance which increases the frequency of the oscillations of the described oscillator. In addition, the electron-hole pairs created by the light near the junction 16 can directly change the junction depletion layer capacitance and thus increase the capacitance and thereby decrease the frequency of the oscillations. The change in frequency is linearly related up to a certain point 43 to the intensity of the light beam 46 as shown in FIG. 2. The straight portion of the curve in FIG. 2 corresponds to the case where the conductivity of the N region increases. That is, for light intensities less than 25 milliwatts per square centimeter, the relation of the light intensity to the frequency change is constant whereby the straight portion of the curve of FIG. 2 is used. The frequency of the produced oscillations may increase as much as 1 megacycle for an increase of approximately 3½ milliwatts per square centimeter of the light intensity applied to the bottom of the kerf 18. Therefore, if the light beam 46 is modulated in intensity, the frequency of the produced wave is modulated in frequency. The light beam 46 may be modulated in any known manner. For example, the light beam 46 may be the light reflected from copy which is to be transmitted in a facsimile manner. The source of the light 46 may be any known source including a laser 47.

FIG. 3 differs from FIG. 1 only in that the block 10′ is of the second of the two types mentioned above and in that the electrode 20′ may be of any material which results in a Schottky barrier region at the interface between the electrode 20′ and the block 10′, such as nickel. The elements in FIGS. 1 and 3 which are similar and are similarly connected are therefore given the same reference characters. While no PN junction is provided in the block 10′ of FIG. 3, a Schottky barrier is formed in the block 10′ in the vicinity of the electrode 20′ which comprises a space charge region whose thickness and therefore whose capacity varies both with variations of the voltage between the electrodes 22 or 24 and 20′ and also with the intensity of the light 46 incident upon the bottom of the kerf 18. The barrier capacitance changes occur for the same reasons outlined in the description of the circuit of FIG. 1. Therefore, the frequency of oscillations produced by the oscillator of FIG. 3 depends on the intensity of the light beam 46 in FIG. 3 as in FIG. 1.

FIG. 4 illustrates a frequency regulator including a light modulated three terminal solid state oscillator of this invention. If desired, the block 10′ (using the nickel electrode 20′) may be substituted for the block 10 of FIG. 4. In so far as elements in FIGS. 1, 3 and 4 are identical, they have been given the same reference characters and no further explanation of such elements appears necessary. In FIG. 4, a variable voltage producing, voice responsive means such as a magnetic microphone 48 is connected in series with the primary winding of a transformer 49 whose secondary winding is connected in a series circuit including the elements 32, 34 and 36 of FIG. 1, whereby the frequency of the oscillations appearing across the load 44 is modulated in accordance with the sound applied to the microphone 48. The frequency modulated oscillations appearing across the load 44 are amplified by an amplifier 50 to which they are applied and the amplified oscillations, after passing through a sampler 52, may be applied to a transmitting medium as indicated by the arrow 54. A sample of the wave applied to the sampler 52 is applied to the comparator 56 to which a wave from a reference oscillator 58 is also applied. The error voltage supplied by the frequency comparator 56 is of a voltage to indicate the difference in the frequency of the wave across the load 44 and the frequency of the wave provided by the oscillator 58. The polarity of the error voltage indicates which of the two frequencies applied to the comparator 56 is higher. The error voltage produced by the comparator 56 is applied to a light supply modulator 60 and the output of the modulator 60 is applied to a light source 62. The light from the source 62 may be focussed on the bottom of the kerf 18 as by a lens 63. The light produced by the source 62 is varied in intensity in such a manner as to keep the average frequency of the wave appearing across the load 44 constant while permitting frequency modulation of the wave appearing across the load 44 by the sound waves applied to the microphone 48. This is accomplished by making the time constant of the frequency regulator comprising the elements 52, 56, 58, 60 and 62 so long that it will only correct slow changes in frequency and it will not overcome the changes in frequency causes by the element 48.

Since modifications of the described device will occur to a person skilled in the art, the above description is to be taken as illustrative and not in a limiting sense.

What is claimed is:

1. Apparatus including a three-terminal solid-state oscillator and an amplitude-modulated light source for generating microwave oscillations which are frequency modulated in accordance with the varying intensity of a light radiation signal applied to said oscillator from said amplitude-modulated light source;

1. wherein said solid-state oscillator comprises a given block of variable space-charge producing solid material having first and second opposite faces with solely said first face being separated into two sections by a kerf cut into said first face and penetrating only a portion of the thickness of said block, a first electrode in cooperative relationship with one of said sections of said first face, a second electrode in cooperative relationship with the other of said sections of said first face, a third electrode in cooperative relationship with said second face, and circuit means including reactive means coupled between said first and third electrodes and between said second and third electrodes to cause said oscillator to oscillate at a predetermined frequency in the dark which depends on the value of said reactive means and the specific characteristics of said given block of solid material, and
2. wherein the frequency of said oscillator is changed from said predetermined frequency by the application of the varying intensity of said light radiation signal to the bottom of said kerf, to thereby frequency modulate the oscillations of said oscillator.

2. The apparatus defined in claim 1, wherein said solid material is GaAs.

3. The apparatus defined in claim 2, wherein the frequency of said oscillator is a linear function of the light intensity applied to said kerf over a predetermined range of light intensities and is a non-linear function of this light intensity outside of said predetermined range, and wherein the intensity of said light radiation signal is within said predetermined range at all times.

4. The apparatus defined in claim 2, wherein said modulated light source is a modulated laser.

5. The apparatus defined in claim 2, wherein said block of GaAs is composed of separate P and N regions with a PN junction therebetween in which there is located a space charge, said kerf being located solely in the N region and extending in a direction substantially perpendicular to said PN junction from said first face to a point sufficiently close to said PN junction for incident light on the bottom of said junction to interact with the space charge within said junction.

6. The apparatus defined in claim 2, wherein said third electrode is composed of a material which exhibits a Schottky barrier region at said second face.

7. The apparatus defined in claim 6, wherein said third electrode is composed of nickel.

* * * * *